US005612171A

United States Patent [19]
Bhagavatula

[11] Patent Number: 5,612,171
[45] Date of Patent: *Mar. 18, 1997

[54] PLANAR OPTICAL WAVEGUIDES WITH PLANAR OPTICAL ELEMENTS

[75] Inventor: Venkata A. Bhagavatula, Big Flats, N.Y.

[73] Assignee: Corning Incorporated, Corning, N.Y.

[*] Notice: The term of this patent shall not extend beyond the expiration date of Pat. No. 5,125,946.

[21] Appl. No.: 387,976

[22] Filed: Feb. 13, 1995

Related U.S. Application Data

[60] Continuation of Ser. No. 87,312, Jul. 7, 1993, abandoned, which is a division of Ser. No. 840,749, Feb. 24, 1992, Pat. No. 5,253,319.

[51] Int. Cl.$^6$ .................................................. G02F 7/00
[52] U.S. Cl. ........................ 430/321; 216/24; 427/585; 427/167; 427/168
[58] Field of Search .................................. 430/321, 323, 430/4; 385/129, 14; 427/585, 167, 168; 216/24

[56] References Cited

U.S. PATENT DOCUMENTS

| | | | |
|---|---|---|---|
| 3,933,454 | 1/1976 | DeLuca | 427/167 |
| 3,934,061 | 1/1976 | Keck et al. | 427/167 |
| 4,141,621 | 2/1979 | Aagard et al. | 385/131 |
| 4,547,262 | 8/1984 | Spillman et al. | 385/130 |
| 4,652,077 | 3/1987 | Erman et al. | 350/96.12 |
| 4,653,844 | 3/1987 | Ward | 385/36 |
| 4,707,057 | 11/1987 | Takahashi et al. | 385/19 |
| 4,712,856 | 12/1987 | Nicia | 385/129 |
| 4,740,951 | 4/1988 | Lizet et al. | 385/14 |
| 4,755,014 | 7/1988 | Stoll et al. | 385/129 |
| 4,786,133 | 11/1988 | Gidon et al. | 385/37 |
| 4,856,861 | 8/1989 | Miyawaki et al. | 385/14 |
| 4,865,453 | 9/1989 | Gidon et al. | 385/14 |
| 4,883,443 | 11/1989 | Booth et al. | 430/321 |
| 5,091,045 | 2/1992 | Froning et al. | 156/633 |
| 5,125,946 | 6/1992 | Bhagavatula | 65/106 |
| 5,210,801 | 5/1993 | Fournier et al. | 385/14 |

FOREIGN PATENT DOCUMENTS

| | | |
|---|---|---|
| 0365125 | 8/1989 | European Pat. Off. . |
| 0446672 | 2/1991 | European Pat. Off. . |
| 0451047 | 4/1991 | European Pat. Off. . |
| 2248297 | 4/1974 | Germany ............... 385/129 |

OTHER PUBLICATIONS

Design of Thin–Film Luneburg Lenses for Maximum Focal Length Control, Optical Society of America, 15 Oct. 1981, vol. 20, No. 20/Applied Optics.

Waveguide Grating Lenses for Optical Couplers, Gen–ichi Hatakoshi, Harumi Fujima, and Kenya Goto, 1 Jun. 1984/ vol. 23, No. 11/Applied Optics.

Low–Index Embedded Waveguide Lenses in GaAs Substrates, Chin C. Lee, Senior Member, IEEE, and Mark M. Minot, Member, IEEE 1041–1135/89/1000–0313$01.00 1989 IEE.

Fresnel Lens in a Thin–Film Waveguide, Paul R. Ashley and William S. C. Chang, Appl. Phys. Lett. 33 (6), 15 Sep. 1978.

High Performance Integrated Fresnel Lenses on Oxidised Silicon Substrate, Electronics Letters, 7th Jan. 1982, vol. 18, No. 1.

A New Guided–Wave Lens Structure, Mark M. Minot, Member, IEEE and Chin C. Lee, Senior Member, IEEE 0733–8724/90/1200–1856$01.00.

Integrated Fresnel Lens on Thermally Oxidized Silicon Substrate, P. Mottier and S. Valette, Applied Optics, vol. 20, No. 9, 1 May 1981.

Graded–Index Fresnel Lenses for Integrated Optics, T. Suhara, K. Kobayashi, H. Nishihara, and J. Koyama, Applied Optics, vol. 21, No. 11/ 1 Jun. 1982.

Integrated Optical Circuits Achieved by Planar Technology on Silicon Substrates: Application to the Optical Spectrum Analyser, IEE Proceedings, vol. 131, Pt.H., No. 5, Oct. 1984.

English language abstract of JP 63–304207, "Light Guide Element and Its Production", Takami et al., (Dec. 1988).

English language Abstract of JP 61–248006, "Optical Demultiplexer", Ishida et al., (Nov. 1986).

English language Abstract of JP 1–205106, "Grating Lens", Itou et al., (Aug. 1989).

English language Abstract of JP 53–079559, "Optical Branching Guide", Watanabe, (Jul. 1978).

English language Abstract of JP 63–291012, "Multiterminal Light Emission Module", Asahara et al., (Nov. 1988).

*Primary Examiner*—John A. McPherson
*Attorney, Agent, or Firm*—William J. Chervenak

[57] ABSTRACT

A planar optical waveguide comprises a substrate 1, a waveguide core layer 2, at least one planar optical element, wherein said planar optical element comprises at least one optically functional interface 3 which is adjacent to a cavity 4, and an overclad layer 5. The cavity enhances the optical characteristics of the planar optical element because of the substantial difference in the refractive index of the cavity as compared to the refractive index of said waveguide core layer.

4 Claims, 4 Drawing Sheets

PLANAR OPTICAL WAVEGUIDES WITH PLANAR OPTICAL ELEMENTS

This is a continuation of application Ser. No. 08/087,312, filed on Jul. 7, 1993, now abandoned, which is a division of application Ser. No. 07/840,749, filed Feb. 24, 1992, now U.S. Pat. No. 5,253,319.

BACKGROUND

This invention relates to planar optical waveguides which contain specific components, or planar optical elements.

A planar optical element, as used in this application, is defined as any integrated optical element formed in the optical path of a planar optical waveguide, including lenses, gratings, and microprisms. The preceding list is illustrative only and is not intended to be all-inclusive.

Several techniques are known for producing planar optical elements in planar integrated optical devices. These methods include: geodesic components (see, e.g., Nicia U.S. Pat. No. 4,712,856); Fresnel lenses (see, e.g., Suhara et al., "Graded-Index Fresnel Lenses for Integrated Optics," Applied Optics, vol. 21, no. 11, pp. 1966–71, Jun. 1, 1982; Luneberg lenses (see, e.g., Columbini, "Design of Thin-film Luneberg-type Lenses for Maximum Focal Length Control", Applied Optics, vol. 20, no. 20, pp. 3589–93, Oct. 5, 1981; and grating lenses (see, e.g., Hatakoshi et al , "Waveguide Grating Lenses for Optical Couplers", Applied Optics, vol. 23, no. 11, pp. 1749–53, Jun. 1, 1984). Another technique has been developed wherein planar optical waveguides and components therein are fabricated using polymers, e.g., Fan et al., EPO Patent Publication No. 0 446 672. Yet another technique involves the use of a low index lens material embedded in a high index planar waveguide, e.g., Minot et al., "A New Guided-Wave Lens Structure", Journal of Lightwave Technology, vol. 8, no. 12, pages 1856–65, December, 1990.

Geodesic lenses are characterized by a surface indentation in the top of the planar optical waveguide. One problem with the geodesic lens is the requirement of tight control during the manufacture of this surface indentation. This tight control during fabrication is required to keep scattering losses at transition points to a minimum. Also, geodesic lenses may not be suitable if additional layers of material need to be deposited over such lenses.

Luneberg lenses, which are a subclass of geodesic lenses, require the use of a lens material which has a higher index of refraction than the planar optical waveguide substrate with which it is used. This may be difficult depending on the refractive index of the planar optical waveguide substrate material, especially if the refractive index of the planar optical waveguide substrate is relatively high. Also, Luneberg lenses are extremely sensitive to small variations in deposition thickness profile.

Fresnel lenses, which are similar to zone plates in bulk optics, rely on phase shifting and/or absorption to obtain the desired focusing effect. This phase shifting is achieved through a series of half-period zones which are applied to a planar optical waveguide. Fresnel lenses exhibit unacceptable wavelength sensitivity, and overclad problems have not been solved. Also, Fresnel lenses, as well as grating lenses, exhibit poor off-axis performance and high chromatic aberration. Fabrication of the half-period zones of a Fresnel lens is difficult to control. For a more detailed discussion of the use of Fresnel lenses in planar optical waveguides, see Ashley et al., "Fresnel Lens in a Thin-film Waveguide", Applied Physics Letters, vol. 33, pages 490–92, Sep. 15, 1978.

Fan et al. EPO Patent Publication No. 0 446 672 is directed to the manufacture of planar optical waveguides from an epoxy polymer material. The planar optical waveguides in Fan et al. exhibited a sharp increase in optical loss above about 230° C., the point at which the polymer began to decompose. The only planar structures investigated in Fan et al. were intersections of planar waveguides and "sharp-corner" waveguide bends. The polymer-based waveguides in Fan et al. were not overclad at all. This resulted in air as the cladding throughout the planar waveguide. This would produce a very high index difference structure which would not be compatible with singlemode and multimode fibers of the type used in telecommunications.

Minot et al. is directed to the use of a lens material with a refractive index which was lower than the refractive index of the planar waveguide. The planar waveguide was fabricated from a high-index III–V compound. By using Corning 7059 glass as the lens waveguiding component, Minot et al. was able to achieve relatively large index differences between the lens region and the host waveguide. This produced lenses with better off-axis performance, lower chromatic aberration, and higher polarization independence than were previously possible. However, Minot et al. is only applicable to III–V compound (e.g., GaAs) planar waveguides and would not produce similar results in planar waveguides based on $SiO_2$ or doped-$SiO_2$ materials such as those widely used in telecommunications applications because the refractive index differential between Corning 7059 glass and silica or doped-silica materials is substantially less than the refractive index differential between Corning 7059 glass and a high-index III–V compound. Also, Minot et al. does not disclose the presence of an overclad layer. This would produce a very high index difference structure over the entire optical path of the planar optical waveguide and would not be compatible with singlemode and multimode fibers of the type used in telecommunications due to high optical losses and mode-field diameter mismatch. Additionally, the absence of any overclad layer would allow changes in the medium adjacent the planar optical waveguide to affect propagation of light in the core layer and would expose the core layer to possible mechanical damage.

Other techniques for producing planar optical elements in planar optical waveguides have been developed.

Spillman et al. U.S. Pat. No. 4,547,262 discloses a method for manufacturing a planar optical waveguide on a substrate of $LiTaO_3$. The process provides for selectively modifying the refractive index of the substrate material through ion exchange techniques to provide predetermined optical geometries. However, Spillman et al. does not disclose the use of any overclad layer. Therefore, the planar optical waveguide produced by this method would have a very high index difference structure over the entire optical path and would not be compatible with singlemode and multimode fibers of the type used in telecommunications.

Aagard et al. U.S. Pat. No. 4,141,621 discloses a method for manufacturing planar optical waveguides made of $Nb_2O_5$. A layer of $TiO_2$ is placed between two layers of $Nb_2O_5$. The $TiO_2$ layer serves the function of an etch stop to provide for more accurate etching of the top $Nb_2O_5$ layer. By etching the top layer of $Nb_2O_5$, the effective refractive index of the area etched is modified. The area etched is in the shape of a lens. Aagard et al. discloses a problem with this method—the effect of the addition of the TiO$_2$ layer: "Introduction of the TiO$_2$ layer for stop-etch purposes causes an increase in waveguide loss and also affects some of the other propagation characteristics. Therefore, the TiO$_2$ must be kept as thin as possible and still provide effective stop-etch characteristics." Aagard et al., col. 3, lines 33–38.

Stoll et al. U.S. Pat. No. 4,755,014 discloses a planar optical waveguide structure in which two surface layers of different effective refractive index are placed contiguously on a substrate. A refractive interface will thereby be provided between the two surface layers. This refractive interface can function as a lens, prism, or planar-to-channel optical waveguide interface, depending on the shape, dimensions and refractive index differential. However, Stoll et al. does not disclose an overclad layer. Therefore, the planar optical waveguide produced by this method would have a very high index difference structure over the entire optical path and would not be compatible with singlemode and multimode fibers of the type used in telecommunications.

Yet another method involves planar optical elements formed in planar optical waveguides consisting of Si$_3$N$_4$ guiding layers with SiO$_2$ cladding layers. This method is described in the following series of articles and patents: Mottier et al., "Integrated Fresnel Lens on Thermally Oxidized Silicon Substrate", Applied Optics, vol. 20, no. 9, pages 1630–1634, May 1, 1981; Valette et al., "Integrated-optical Circuits Achieved by Planar Technology on Silicon Substrates: Application to the Optical Spectrum Analyser", IEE Proceedings, vol. 131, pt. H, no. 5, pages 325–31, October, 1984; Lizet et al. U.S. Pat. No. 4,740,951; Gidon et al. U.S. Pat. No. 4,786,133; and Gidon et al. U.S. Pat. No. 4,865,453.

Mottier et al. discloses a planar optical waveguide with Fresnel lenses. The Fresnel lens is chemically etched into the SiO$_2$ "overlayer" to produce a change in the effective refractive index of the planar waveguide in the area of the lens. There is no cavity disclosed or suggested by Mottier et al. nor is there any suggestion or disclosure of an overclad layer on top of the etched lens.

Valette et al. discloses a variety of optical components designed into silicon-based planar optical waveguides. The planar optical waveguide structure consists of: (1) a silicon substrate, (2) a 1–4 μm thick layer of silica obtained by thermal oxidation of the silicon substrate, (3) a thin layer of silicon nitride, and (4) a silica overlayer. The refractive index differential is obtained by local etching of the SiO$_2$ overlayer. Valette et al., pages 327, 328. Valette et al. does not disclose any overcladding applied over the etched optical components nor does it disclose a cavity as part of the optical components.

Lizet et al. discloses a planar optical waveguide which can function as a multiplexer or a demultiplexer. The basic structure of the waveguide is similar to that described in Valette et al. The are several optical components which work in combination to perform the desired function of the waveguide. Diffraction gratings serve to separate the input light beam into discrete beams carrying a given wavelength. These gratings are obtained by etching either only the top silica layer of the waveguide or by etching the top silica layer and partially etching the silicon nitride layer. The gratings may be overclad, but if an overclad layer is applied, no cavities are left in the area of the gratings. There are also several mirrors which serve to reflectively focus the light onto the gratings or onto output microguides. These mirrors are obtained by etching through the top three layers of the waveguide structure. Lizet et al. does not disclose or suggest overcladding the mirror components.

Gidon et al. '133 discloses a planar optical waveguide which functions as a multiplexer or demultiplexer. The basic structure of the planar optical waveguide is similar to that described in Valette et al. above. A principal optical component of the device is a diffraction grating. This grating is obtained by etching through the top three layers of the waveguide structure. The grating has facets whose two foci coincide respectively with the input and output portions of the planar optical waveguide. The functional surface of the grating can be coated with a metal layer to enhance its reflective characteristics. Gidon et al. '133 does not disclose or suggest overcladding the grating.

Gidon et al. '453 discloses a planar optical waveguide which functions as a displacement transducer. The basic structure of the planar waveguide is similar to that described in Valette et al. above. Some of the optical components are obtained by local etching of the top layer of silica as previously described in Valette et al. Two mirror components are obtained by local etching of the three top layers of the waveguide. Gidon et al. '453 does not disclose or suggest overcladding of the mirror components.

It is an object of this invention to provide a planar optical waveguide, compatible with the needs of telecommunications applications, with at least one planar optical element embedded in the planar optical waveguide, the planar optical element comprising at least one optically functional interface adjacent to a cavity, wherein there is a substantial difference between the refractive indices of the cavity and the adjacent core regions of the planar optical waveguide.

It is another object of this invention to provide a planar optical waveguide with at least one planar optical element embedded in the planar optical waveguide, the planar optical element comprising at least one optically functional interface adjacent to a cavity, wherein the planar optical waveguide provides the function of an M×N coupler.

It is another object of this invention to provide a planar optical waveguide with at least one planar optical element embedded in the planar optical waveguide, the planar optical element comprising at least one interface adjacent to a cavity, wherein the planar optical element is mechanically and optically protected by an overclad layer.

It is another object of this invention to provide a method for manufacturing planar optical waveguides which are the subject of this invention.

SUMMARY OF THE INVENTION

My invention resides in planar optical waveguides containing planar optical elements, said planar optical elements comprising interfaces adjacent to cavities. The cavities may be evacuated or contain air or they may contain other materials such that there is a substantial difference between the refractive index of the cavity and regions of core glass adjacent to the cavity. Planar optical waveguides which are the subject of the present invention can be designed for attachment to and operation with conventional singlemode or multimode optical waveguide fibers.

In accordance with one aspect of my invention, a planar optical waveguide is provided with at least one planar optical element comprising at least one optically functional interface adjacent to a cavity, said cavity containing air or being evacuated. This results in a refractive index for the cavity of about 1.0. For example, in lenses, this refractive index difference allows for designs with relatively short focal lengths in planar optical waveguides where the refractive indices of the regions of core glass of said planar optical waveguides are relatively high. In this case, the cavity is concave shaped to function as a focusing lens.

In accordance with another aspect of my invention, a planar optical waveguide is provided with planar optical elements each comprising at least one optically functional interface adjacent to a cavity, said cavity containing doped silica glass or other materials such as amorphous silicon, silicon nitride or silicon oxynitride. This results in a refractive index for the filled cavity of greater than about 1.5. For example, in lenses, this refractive index difference allows for designs with relatively short focal lengths in planar optical waveguides where the refractive indices of the regions of core glass of said planar optical waveguide are relatively low, for example, where the regions of core glass are made of undoped silica. In this case, the cavity is convex shaped to function as a focusing lens.

DETAILED DESCRIPTION

Figure 1:
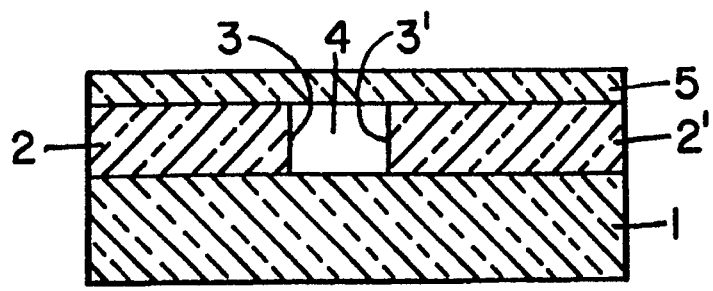
FIG. 1 is a cross-sectional representation of a planar optical waveguide made in accordance with the present invention.

A planar waveguide which is the subject of the present invention is shown in FIG. 1, comprising a substrate region 1, a region of core glass 2, a region of core glass 2', an interface 3, an interface 3', a cavity 4 between interfaces 3 and 3', and an overclad layer 5. Interface 3, cavity 4 and interface 3' comprise a planar optical element.

A planar optical waveguide which is the subject of the present invention may be manufactured by a process which is similar to that described in application Bhagavatula U.S. application Ser. No. 625,153, filed Dec. 10, 1990, now U.S. Pat. No. 5,125,946, assigned to the assignee of the present invention, and incorporated herein by reference.

The precursor of substrate region 1 is an essentially planar substrate material of silica and having dimensions substantially greater than those of the final planar optical waveguide. A layer of core glass, composed of silica soot doped with a suitable refractive index modifying dopant material, for example, germania, is applied to substrate 1 to form a composite structure.

This composite structure is then heated to a temperature sufficient to consolidate and fuse the layer of core soot onto the substrate material. The resulting fused glass structure is then heated to the softening point and stretched to produce planar optical cane of the preselected end dimensions. The cross sectional dimensions of the planar optical cane are substantially the same as the cross sectional dimensions of the final planar optical waveguide.

One or more planar optical waveguide paths within region of core glass 2 and region of core glass 2', as well as cavity 4 are then etched into the planar optical cane by a lithographic process. An overclad layer 5 of silica is then applied in soot form and heated to a temperature sufficient to consolidate and fuse the soot to the planar optical waveguide. The dimensions of cavity 4 are chosen such that the cavity will not be filled by the overclad layer 5.

If cavity 4 is filled with air or evacuated, it will have a refractive index of about 1.0, whereas the refractive indices of the regions of core glass 2 and 2' will be about 1.5, the refractive index of doped $SiO_2$ glass. With this substantial difference in refractive indices, substantial optical benefits may be obtained. For example, if interface 3 is a lens element, the refraction of light passing through the interface increases with increasing refractive index differential. Therefore, the higher the refractive index differential, the shorter the effective focal length of the lens element. This allows for compact design of complicated planar optical waveguides as a larger number of planar optical elements can be included in a planar optical waveguide of given size. Also, a higher refractive index differential allows for a smaller radius of curvature for a lens element. This allows for a potentially larger numeric aperture or angle of acceptance. A smaller radius of curvature will also generally reduce the spherical aberrations caused by the lens element. The substantial difference in refractive index is greater than about 0.04, with a preferred range of about 0.04 to 2.0.

Figure 2:
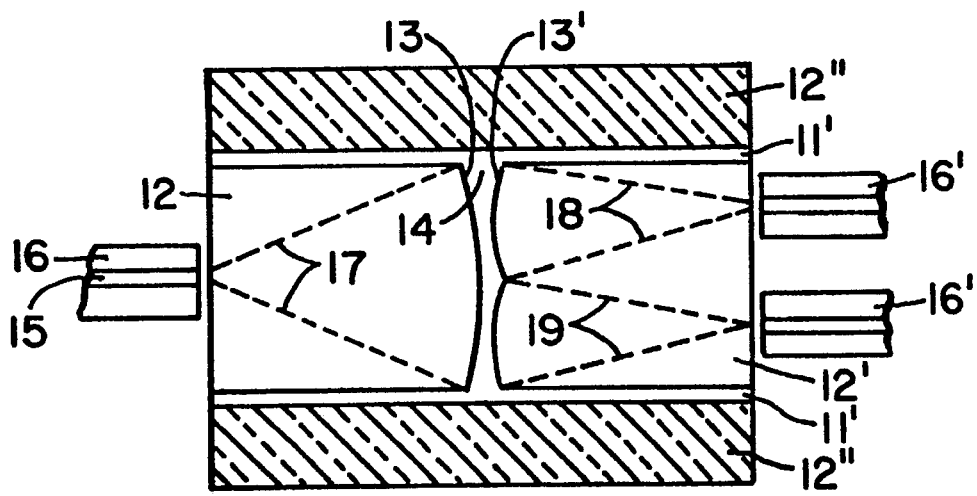
FIG. 2 depicts a 1×2 coupler made in accordance with the present invention.

FIG. 2 depicts a top view of the planar optical waveguide shown in FIG. 1 without the overclad layer shown. The device depicted in FIG. 2 is a 1×2 coupler made in accordance with the present invention. Light from an optical waveguide fiber 16 enters the core region 12. The arc of interface 13 is chosen such that substantially all of the light from an optical waveguide fiber 16 with core 15 positioned at or near the focal point of interface 13 strikes interface 13 as shown in FIG. 2 by dashed lines 17. The light from optical waveguide fiber 16 is collimated by interface 13.

The arcs of the two lens surfaces of interface 13' are chosen such that the resulting focal points are at about the right-hand edge of the planar optical waveguide. This allows for substantially all of the light passing through interface 13' to be coupled into the optical fibers 16' as shown by dashed lines 18 and 19 in FIG. 2.

Core layer regions 12" are non-functional areas of the planar optical waveguide. The two channels 11' where the core layer has been etched to expose the substrate region may or may not be filled with the overclad layer. In this example of a 1×2 coupler, these channels need not be filled with the overclad layer because the interface 13 is designed such that substantially all of the light from the input optical fiber 16 strikes interface 13 with essentially none of the light from the input optical fiber 16 striking either of the interfaces between region of core glass 12 and channels 11'. Similarly, interface 13' is designed such that substantially all of the light passing through interface 13' is coupled directly into optical fibers 16' and essentially none of the light passing through interface 13' strikes either of the interfaces between region of core glass 12' and channels 11'.

Figure 3:
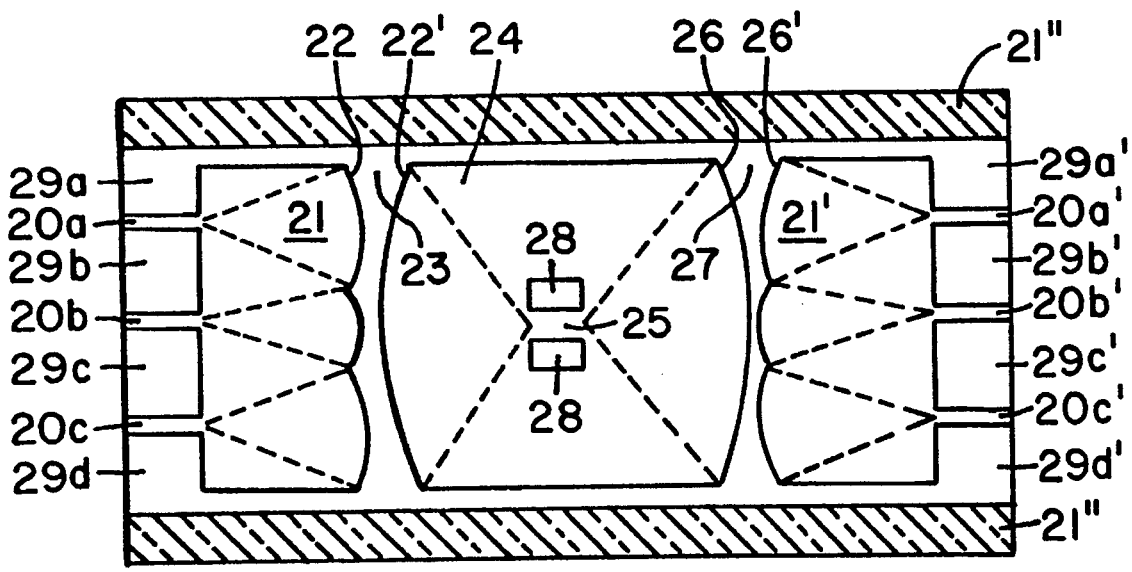
FIG. 3 depicts a 3×3 coupler made in accordance with the present invention.

The advantages of small focal lengths achievable in planar optical waveguides made in accordance with the present invention are substantial. FIG. 3 depicts a 3×3 coupler made in accordance with the present invention. Light from three input optical waveguide fibers (not shown) enters the coupler from the left-hand edge into input microguides 20a–20c which are essentially square waveguides formed in core region 21 by etching channels 29a–29d. The light from each of the input microguides 20a–20c is refracted across cavity 23 by each of the lenslets of interface 22. Interface 22' then refracts all of the light such that it focuses into the beam mixer 25 formed by etching channels 28 in region of core glass 24.

Beam mixer 25 functions to provide a better distribution of the light striking interface 26. Interface 26 collimates the light striking interface 26 across cavity 27. The lenslets of interface 26' then focus the light striking interface 26' into output microguides 20a'–20c' which are formed in region of core glass 21' by etching channels 29a'–29d'.

Channels 28, 29a–29d, and 29a'–29d' are filled when the overclad layer is applied to create the refractive index differential required for waveguide propagation through input microguides 20a–20c, output microguides 20a'–20c' and beam mixer 25 according to basic lightwave propagation theory.

The 3×3 coupler depicted in FIG. 3 is also designed to be bi-directional. The input light may enter from the left-hand edge, as described above, or from the right-hand edge. Because of the symmetric design about the beam mixer 25, the coupling action would be similar when either the left-hand or right-hand edge is used as the input.

Figure 4A:
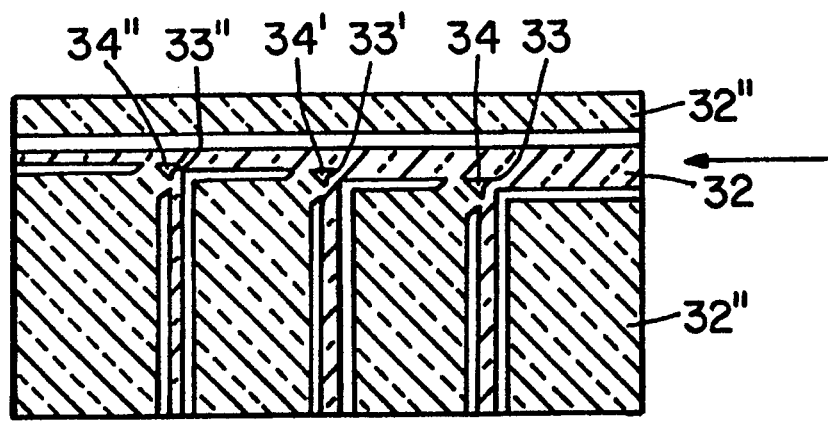
FIGS. 4a and 4b depict a 1×4 coupler with 90° branching microprisms made in accordance with the present invention.

Also, a substantial number of planar optical elements may be combined into a single planar optical waveguide to create complex optical subsystems such as the 1×4 coupler with 90° branching shown in FIG. 4a. Light from an optical fiber enters the core region 32 of the planar optical waveguide from the right at the point indicated by the arrow. Interfaces 33, 33', and 33" each redirect approximately one-fourth of the total light power which initially enters the planar optical waveguide. Core layer regions 32" are non-functional portions of the core layer of the planar optical waveguide. The channels 31' where the core layer has been etched to expose the substrate region are designed to be filled with the overclad layer to create the refractive index differential required for waveguide propagation through core region 32 according to basic lightwave propagation theory.

Figure 4B:
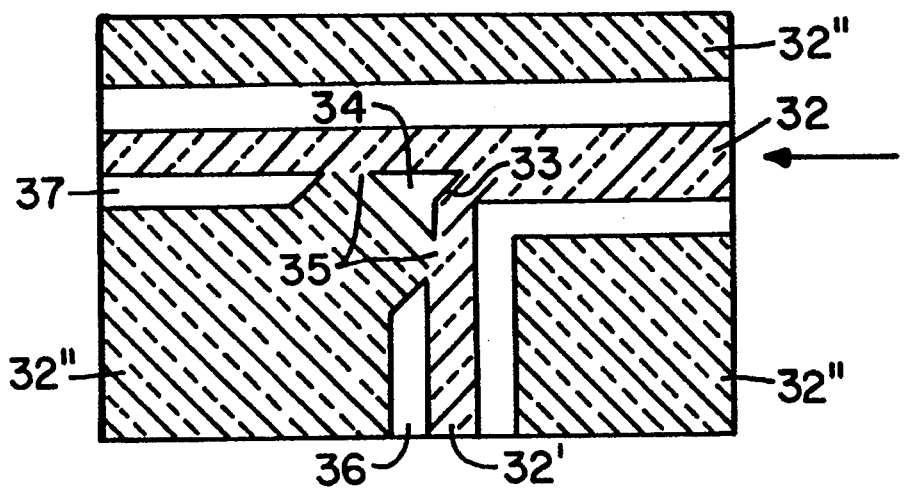

The area around interface 33 is expanded in FIG. 4b to show details. Interface 33 is angled at 45° and extends into core region 32 a distance sufficient to deflect one-fourth of the total light power which initially enters the planar optical waveguide. Cavity 34 is filled with air or vacuum, and the refractive index of cavity 34 is 1.0. Since the angle of incidence of light striking interface 33 will be less than the critical angle, total internal reflection (TIR) will occur for that portion of the light which strikes interface 33. This will cause the light striking interface 33 to be deflected into core region 32'. Similar deflections will occur at interfaces 33' and 33".

The gaps 35, located between cavity 34 and channels 36 and 37 in FIG. 4b, are on the order of 5–20 μm in length. Because of the relatively short lengths of these gaps 35, essentially none of the light in core regions 32 or 32' propagates through gaps 35 into core layer region 32a".

Figure 5:
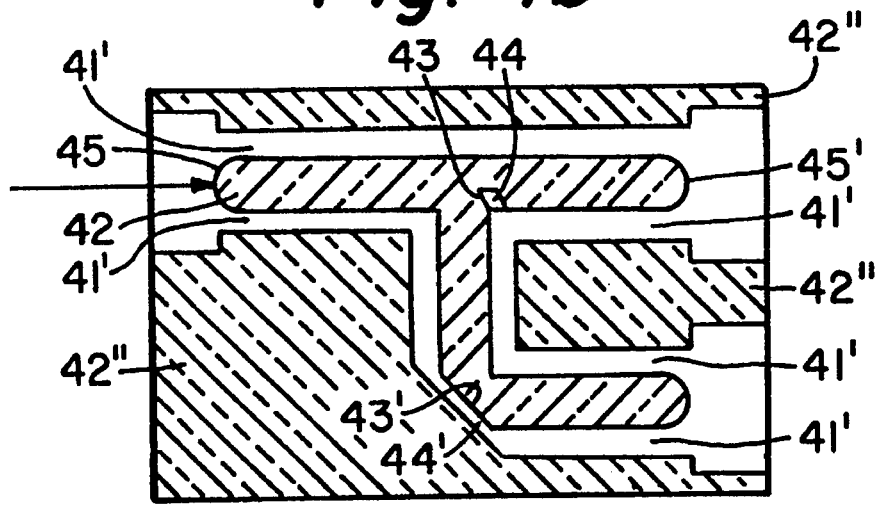
FIG. 5 depicts a 1×2 splitter made in accordance with the present invention.

Another example of the present invention is a 1×2 splitter as depicted in FIG. 5. Here, the input light, shown by the arrow, is split into two output channels. The planar optical element consisting of interface 43 and cavity 44 splits the input in half and redirects one half of the input at a 90° angle. The planar optical element consisting of interface 43' and cavity 44' redirects that same portion of the input at a 90° angle such that both output channels are physically located on the same edge of the planar optical waveguide. The channels 41' are filled when the overclad layer is applied to create the refractive index differential required for waveguide propagation through core region 42 according to basic lightwave propagation theory. The physics of the light reflection at interfaces 43 and 43' is similar to that of the 1×4 splitter with 90° branching as described with respect to the device of FIGS. 4a and 4b.

The lens interface 45 at the input of core region 42 serves to focus the light entering core region 42 from an input optical waveguide fiber (not shown) into core region 42. The lens interfaces 45' and 45" at the output of core region 42 serve to focus the light exiting core region 42 into the output optical waveguide fibers (not shown).

FIG. 6 depicts a 1×4 splitter in which the planar optical element consisting of interface 53 and cavity 54 splits the incoming signal into two parts and the planar optical elements consisting of interface 53' and cavity 54' and interface 53" and cavity 54", respectively, each split the two parts of the signal from the first planar optical element into two parts. The planar optical elements consisting of interfaces 58, 58', 60, 60', 62, and 62' and cavities 59, 59', 61, 61', 63, and 63', respectively, redirect the light striking those interfaces such that the four output channels are located physically on the same side of the planar optical waveguide. The physics of the light reflection at these interfaces are similar to that of the preceding two examples. Channels 51' are filled when the overclad layer is applied to create the refractive index differential required for waveguide propagation through core region 52 according to basic lightwave propagation theory.

Figure 7A:
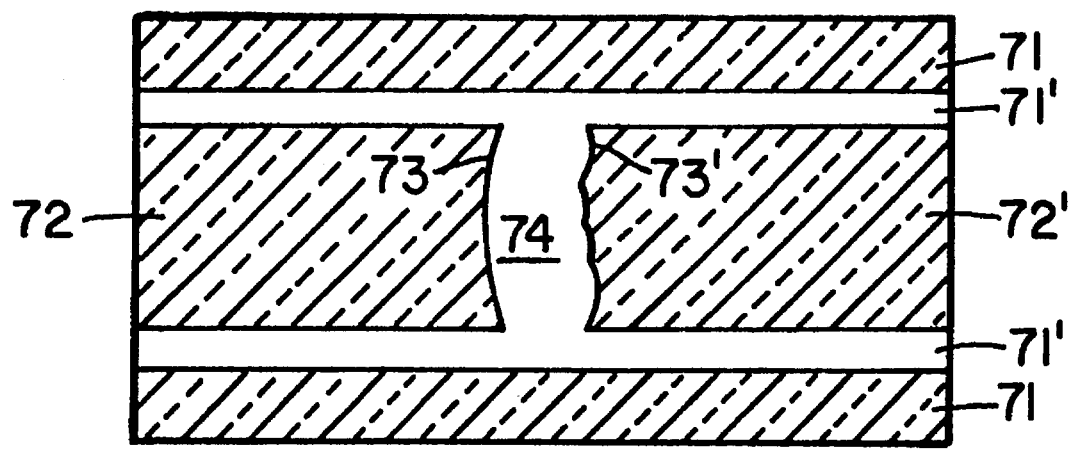
FIGS. 7a and 7b depict an alternative design for a 1×2 coupler made in accordance with the present invention.
Figure 7B:
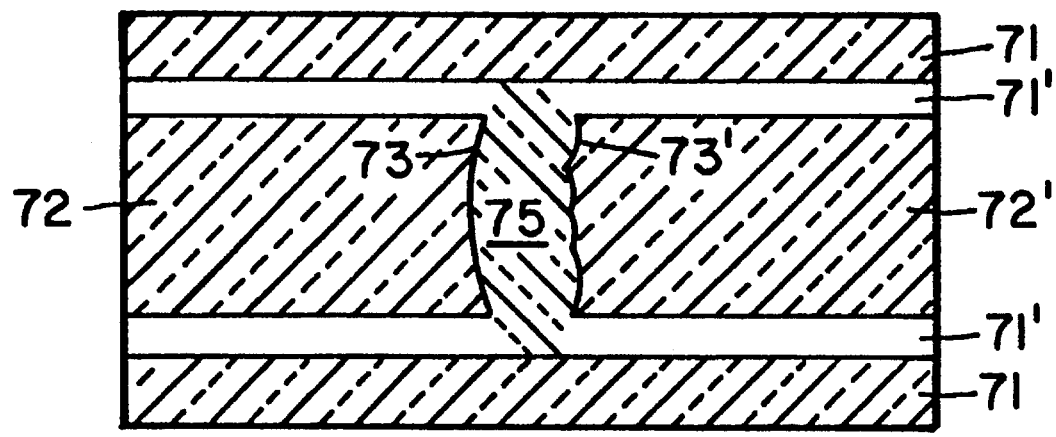

In yet another embodiment of the present invention, as shown in FIG. 7a, a planar optical element consists of interfaces 73 and 73' and cavity 74. The planar optical waveguide of FIG. 7 depicts a 1×4 coupler. After etching as depicted in FIG. 7a, cavity 74 is filled with doped-silica glass 75 as shown in FIG. 7b. The composition of said doped-silica glass 75 is chosen such that the refractive index of said doped-silica glass 75 is substantially higher than that of regions of core glass 72 and 72'. The light enters the planar optical waveguide from a single optical waveguide positioned at the left-hand edge (not shown). The light is collimated by interface 73. The shape of interface 73' is chosen to account for the Gaussian power distribution of the light passing through the planar optical waveguide such that the collimated input light is divided into four equal parts and focused at four points near the right edge where four output optical waveguides are positioned (not shown). Channels 71' are filled when the overclad layer is applied to create the refractive index differential required for waveguide propagation through core regions 72 and 72' according to basic lightwave propagation theory. The refractive index differential is greater than about 0.04, with a preferred range of about 0.04 to 2.0.

The process for making planar optical waveguides which are the subject of the present invention will be discussed in more detail with reference to the planar optical waveguides shown in FIGS. 6a–6c, 7a and 7b. This process is similar to that described in application Bhagavatula U.S. application Ser. No. 625,153, filed Dec. 10, 1990, now U.S. Pat. No. 5,125,976, and assigned to the assignee of the present invention. It is not required, however, that the planar optical waveguides of the present invention be manufactured according to the above-referenced process.

Figure 6A:
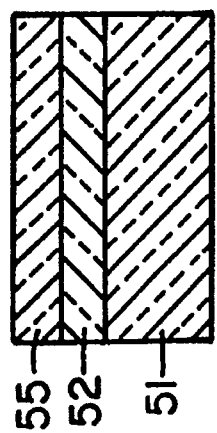
FIGS. 6a–c depict a 1×4 splitter made in accordance with the present invention.

FIG. 6a shows a side view of one example of a planar optical preform. The process used to manufacture this example is now described.

Substrate 51 is made of fused silica or other suitable material and has essentially planar dimensions which are substantially larger than the desired dimensions of the final planar optical waveguide. In this example, the dimensions of substrate 51 are about 35 cm long by 5 cm wide by 1.2 cm thick. Handles are attached to substrate 51 for use during processing but are not shown.

Core layer 52 is applied to the top surface of substrate 51 using conventional soot deposition techniques which are well known in the art. The thickness of core layer 52 is about 100 μm. The core layer 52 consists of $SiO_2$ and 8% by weight $GeO_2$. An overclad layer 55 is applied over core layer 52 using conventional soot deposition techniques. Overclad layer 55 is about 100 μm thick and comprises $SiO_2$.

The resulting planar optical preform is then heated to at approximately 1540° C. for approximately 20 minutes to fuse core layer 52 and overclad layer 55 to substrate 51 to form a planar optical blank. The resulting planar optical blank is then heated to the softening point, about 2100° C. and stretched to produce planar optical cane with cross-sectional dimensions of about 0.4 cm wide by 0.006 cm thick. The resulting thickness of the core layer 52 is about 6–8 μm.

The planar optical cane may be processed in long lengths such that several planar optical waveguides may be produced on a given length. Then the individual planar optical waveguides may be cut apart at the end of the process. Alternatively, the planar optical cane may be cut to lengths that are essentially the desired length of the final planar optical waveguides and processed individually. The remainder of this description of the process will assume that the planar optical cane is cut to lengths that are essentially the desired length of the final planar optical waveguide and processed individually.

Figure 6B:
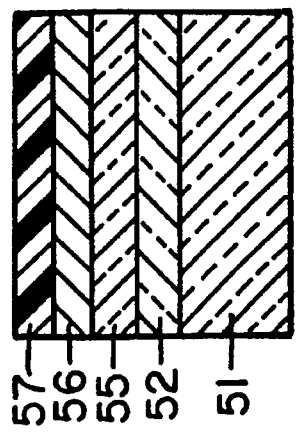

FIG. 6b shows a side view of a portion of the resulting planar optical waveguide blank during the lithographic processing. After repeated cleaning in a solution of de-ionized water, acetone and 1–2% HF, chrome coating 56 is applied to the planar optical waveguide blank using RF-sputtering techniques. Then organic photo-resist coating 57 is applied over chrome layer 56 by a spin coating process at about 3000 rpm. The coated planar optical blank is then baked in an oven at about 110° C. for about 20 minutes.

Using conventional techniques, an optical circuitry mask is prepared with the preselected optical circuitry pattern. The coated planar optical blank is aligned with the optical circuitry mask and the organic photo-resist coating 57 is exposed to ultraviolet light, thereby transferring the preselected optical circuitry pattern to the organic photo-resist coating 56. The pattern is developed using commercially available photo-resist developer. The exposed organic photo-resist coating is then removed by rinsing in de-ionized water.

The chrome coating uncovered by the removal of the exposed organic photo-resist coating is removed using a commercial chrome etch solution. Thereafter, any remaining organic photo-resist coating is removed by washing the planar optical waveguide blank with acetone and rinsing in de-ionized water. As a result, the planar optical waveguide blank has a chrome coating in the pattern of the preselected optical circuitry.

The unprotected glass portions of the planar optical waveguide blank are then etched using a reactive ion technique. Thereafter, any remaining chrome coating is removed using a commercial chrome etch solution. The planar optical waveguide blank is the washed in a solution of de-ionized water, commercial glass cleaner and 1–2% HF, rinsed in de-ionized water and dried.

Figure 6C:
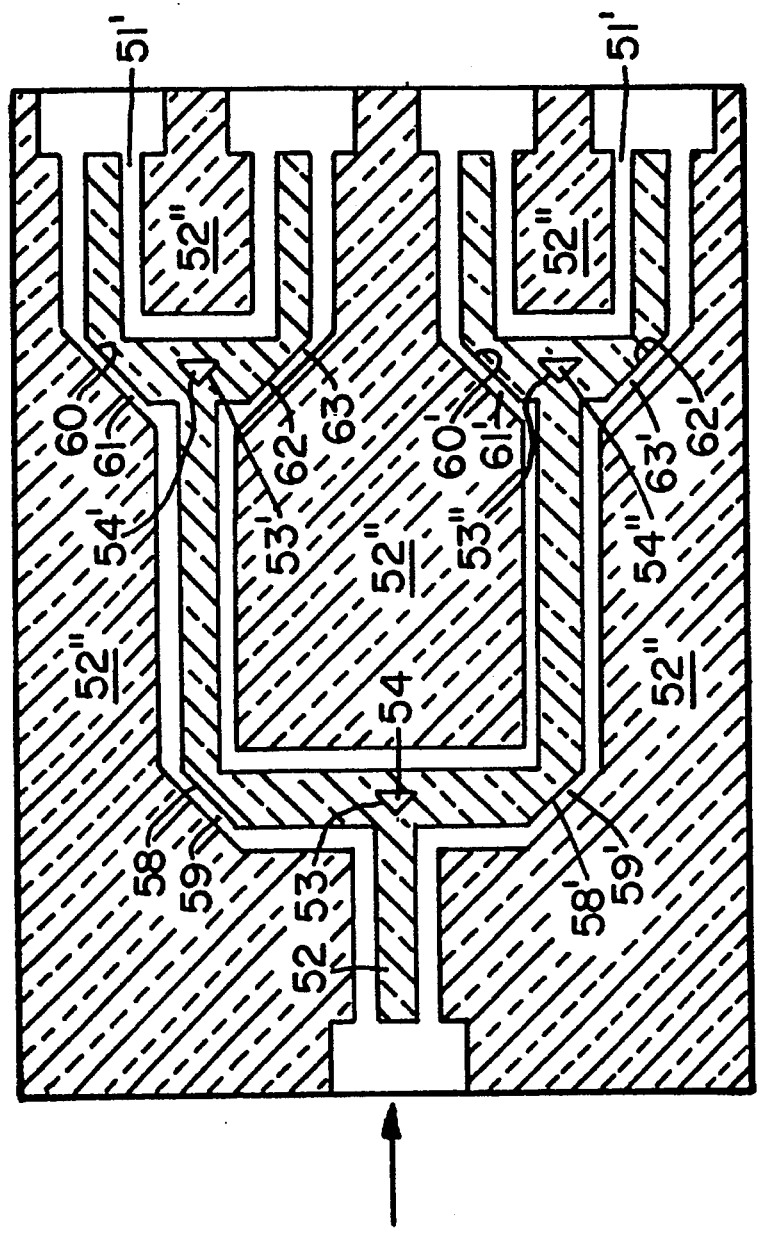

The resulting planar optical waveguide blank is shown in FIG. 6c. In the process of making the planar optical waveguide depicted in FIG. 6c, the dimensions of channels 51' are designed to be approximately 30 μm in width. The triangular cavities 53, 53', and 53" are designed to have a hypotenuse equivalent to the width of core region 52, which is about 6–8 μm in width for singlemode applications. For multimode applications, narrow channel v-grooves may be used in place of the triangular cavities. Cavities 59, 59', 61, 61', 63, and 63' are designed to be approximately 3 μm in width. These dimensions are determined during the lithographic processing of the planar optical waveguides previously described and referenced.

The overclad layer (not shown in FIG. 6c) is then applied using soot deposition techniques, well-known in the art. The temperature to which the soot overclad layer is exposed to fuse the overclad layer to the planar optical waveguide is in the range of 1450° C. to 1500° C. The soot comprises $SiO_2$ or $SiO_2$ doped with low levels (<2 wt. %) of materials such as, for example, $GeO_2$, $B_2O_3$, or $P_2O_5$. I have discovered that this temperature and composition, in combination with the relative widths and shapes of the cavities as compared to the channels has the following result: the channels are filled when the overclad layer is applied while the cavities are not. This phenomenon is believed to be similar to capillary action. During the soot deposition, there is little or no circulation within the cavity, therefore, the soot particles tend to stream away from the cavity and tend not to fill the cavity. Also, the overclad layer does not sag during the fusing step due to its composition and the fusing temperature. Also, the depth of the cavity may be intentionally etched deeper than the core region of the planar optical waveguide such that any soot which might accumulate in the bottom of the cavity does not cover the core region, i.e., there will still be a cavity at the region of core glass in the planar optical waveguide.

Other techniques can be used to apply the overclad layer. The simplest technique involves the rigid attachment of thin layers of optical material of the appropriate refractive index to the surface of the planar optical waveguide.

Another method of applying the overclad layer is by tape casting techniques. A slurry is made containing particles of optical material with the required refractive index. The slurry is then made into thin film sheets. These thin film sheets are then placed on the planar optical waveguide and heated to fuse to the planar optical waveguide. The optical materials used in this method do not devitrify as a result of the heating and fusing steps.

Another method which can be used to apply the overclad layer is plasma-enhanced chemical vapor deposition (PECVD) using silane and nitrous oxide. PECVD occurs at a much lower temperature than conventional chemical vapor deposition (CVD) techniques. Again, the depth of the cavity can be designed to accomodate partial filling of the cavity while still leaving a cavity at the optically functional region of core glass. Also, the lower temperature of PECVD would allow for the application of a layer of polymer material to be placed over the cavity before the PECVD steps. The refractive index of the layer of polymer material would be the same as the refractive index of the overclad layer. The polymer layer would effectively seal the cavity so that no filling of the cavity would occur during the PECVD steps.

The overclad layer can also be applied in two steps. In the first step, an overclad layer would be applied which would fill the channels of the planar optical waveguide without overcladding or filling the cavities, for example, by masking the cavities but not the channels. In the second step, the cavities would be overclad but not filled as previously described.

In planar optical waveguides of the type shown in FIGS. 7a and 7b, additional steps occur in the process. After the lithographic processing of the planar optical waveguide has occurred and before the overclad layer is applied, appropriate high index material is applied such that the cavity is filled with the high index material. The high index material may be doped-silica glass or other materials such as silicon nitride or silicon oxynitride. This high index material may be applied by conventional soot deposition techniques or the other methods described above. The planar optical waveguide is then heated to fuse the high index material to the planar optical waveguide. Finally, the overclad layer is applied and fused to the planar optical waveguide.

Where the cavity is intended to be filled with a high index material, the cavity is generally larger than in the case where the overclad layer is not intended to fill the cavity. Additionally, the cavity may be etched less deeply than in the case of the unfilled cavity so that the applied high index material more easily fills the cavity to the optically functional level of the core region of glass.

In examples of couplers and splitters, the geometry of the planar optical elements may be altered to modify the coupling or split ratios. For example, in the 1×2 splitter shown in FIG. 5, the distance interface 43 extends across region of core glass 42 would determine the amount of light split into each of the two outputs. Similarly, in the 1×4 coupler shown in FIG. 7b, the length of the individual lens surfaces of interface 73' would determine the amount of light coupled into each of the four output channels.

The performance of devices made from planar optical waveguides is generally expressed in terms of excess loss. Excess loss indicates the amount of light lost above the light lost in each optical channel due to the splitting of the optical circuitry. Planar optical waveguides produced in accordance with the present invention have obtained excess losses in the range of 2–3 dB for a 1×8 coupler design. The amount of loss for a particular planar optical waveguide depends, in part, on the complexity of the optical circuitry, i.e., the more planar optical elements in a particular circuit, the greater the excess loss. The amount of loss also increases with increased manufacturing defects, such as rough interface surfaces, i.e., the greater the roughness of the interface, the more loss due to scattering of the light. This compares to excess losses of other methods described previously herein as high as 8–10 dB. Theoretically, the excess loss from planar optical waveguides made according to the present invention could be as low as about 0.1 to 0.2 dB.

M×N couplers are of particular importance to telecommunications applications. Proximity coupling and y-splitter tree and branch designs have been produced in planar optical waveguides. Such devices generally range in size from 20 mm to 40 mm. The manufacturing tolerances required in producing these devices are quite restrictive. For example, for a singlemode application, the core region dimensions would be about 6–8 μm after manufacturing by etching. This dimension would need to be accurate to ± about 0.5 μm to avoid excessive propagation losses in the planar optical waveguide. Also, y-splitter tree and branch and proximity coupling designs are best suited for producing couplers where M and N are equal to $2^x$ and $2^y$, respectively, where x and y are integers.

M×N couplers produced in planar optical waveguides according to the present invention have several advantages over y-splitter tree and branch and proximity coupling designs. First, the overall size of a comparable M×N coupler produced according to the present invention would be in the range of 2–5 mm. Second, the manufacturing tolerances required for the dimensions of the cavity in planar optical waveguides of the present invention could be as high as a few microns without adversely affecting the propagation of light through the planar optical waveguide. A change of a few microns in the cavity dimensions would only have a minor affect on the focal lengths or on coupling losses through the interface. Third, M×N couplers such as, for example, 1×3 or 1×6 can be easily implemented using planar optical waveguides of the present invention since the coupling can be more easily controlled. Fourth, the theoretical losses from an M×N coupler made in accordance with the present invention would be lower than for a comparable y-splitter tree and branch design due to fewer interfaces within the planar optical waveguide. For example, a 1×8 coupler made in accordance with the present invention would contain two interfaces in the optical path, one at each of the boundaries of the cavity. This compares to 3 splitter interfaces in each optical path of a 1×8 coupler made using y-splitter tree and branch design.

While the planar optical waveguides, and the process for manufacturing the planar optical waveguides of the present invention, disclosed herein have been described with respect to glass materials, other materials may be utilized. For example, the optically-functional regions may comprise optically transmitting materials such as polymers, plastics, amorphous silicon, silicon, and transparent glass ceramics. Similarly, the substrate may comprise the aforementioned optically transmitting materials or it may comprise such non-optically transmitting materials as refractory materials, for example, alumina, or metallic materials.

The present invention has been particularly shown and described with reference to the preferred embodiments thereof. However, it will be understood by those skilled in the art that various changes may be made in the form and details of these embodiments without departing from the true spirit and scope of the invention as defined by the following claims. For example, although the invention has been described herein primarily with reference to planar optical elements such as lenses and microprisms, it may also be applied to other planar optical elements such as gratings. Also, the present invention is designed to function with conventional singlemode or multimode optical waveguide fibers.

I claim:

1. A process for manufacturing planar optical waveguides, comprising (a) forming a planar structure by combining a substrate having a first refractive index with at least one region of an optically transmitting material having a second refractive index which is different from said first refractive index;

(b) removing material from at least one portion of said planar structure using lithographic techniques to produce thereon, (i) preselected optical circuitry, and (ii) at least one planar optical element comprising at least one optically functional interface and at least one cavity having a width adjacent to said optically functional interface; and (c) combining a region of additional material with said planar structure over at least one area where material has been removed, wherein said region of additional material does not alter said width of said at least one cavity adjacent to said optically functional interface, wherein said planar structure is heated and stretched prior to said removing step.

2. A process for manufacturing planar optical waveguides, comprising (a) forming a planar structure by combining a substrate having a first refractive index with at least one region of an optically transmitting material having a second refractive index which is different from said first refractive index;

(b) removing material from at least one portion of said planar structure using lithographic techniques to produce thereon, (i) preselected optical circuitry, and (ii) at least one planar optical element comprising at least one optically functional interface and at least one cavity having a width adjacent to said optically functional interface; and (c) combining a region of additional material with said planar structure over at least one area where material has been removed, wherein said region of additional material does not alter said width of said at least one cavity adjacent to said optically functional interface, wherein said region of additional material is applied using tape casting techniques.

3. A process for manufacturing planar optical waveguides, comprising (a) forming a planar structure by combining a substrate having a first refractive index with at least one region of an optically transmitting material having a second refractive index which is different from said first refractive index;

(b) removing material from at least one portion of said planar structure using lithographic techniques to produce thereon, (i) preselected optical circuitry, and (ii) at least one planar optical element comprising at least one optically functional interface and at least one cavity having a width adjacent to said optically functional interface;

(c) combining a region of additional material with said planar structure over at least one area where material has been removed, wherein said region of additional material does not alter said width of said at least one cavity adjacent to said optically functional interface; and (d) fusing said at least one region of optically transmitting material to said substrate at a first temperature and fusing said region of additional material to said planar structure at a second temperature, wherein the second temperature is substantially lower than the first temperature.

4. A process for manufacturing planar optical waveguides, comprising (a) forming a planar structure by combining a substrate having a first refractive index with at least one region of an optically transmitting material having a second refractive index which is different from said first refractive index;

(b) removing material from at least one portion of said planar structure using lithographic techniques to produce thereon, (i) preselected optical circuitry, and (ii) at least one planar optical element comprising at least one optically functional interface and at least one cavity having a width adjacent to said optically functional interface; and (c) combining a region of additional material with said planar structure over at least one area where material has been removed, wherein said region of additional material does not alter said width of said at least one cavity adjacent to said optically functional interface, wherein a layer of polymer material is applied over said at least one cavity before applying said region of additional material, wherein said layer of polymer material does not alter the width of said cavity adjacent to said optically functional interface; and wherein said region of additional material is applied using low temperature, plasma-enhanced chemical vapor deposition techniques.

* * * * *